June 3, 1930.  M. SMOLENSKY  1,761,595
VALVE
Filed May 11, 1928  2 Sheets-Sheet 1

INVENTOR.
Michael Smolensky
BY John A. Bommhardt
ATTORNEY.

June 3, 1930.  M. SMOLENSKY  1,761,595
VALVE
Filed May 11, 1928  2 Sheets-Sheet 2
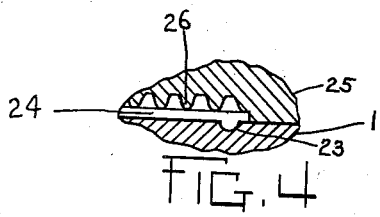
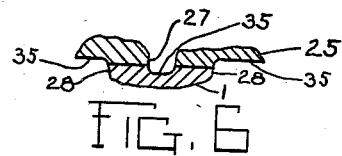
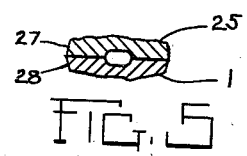
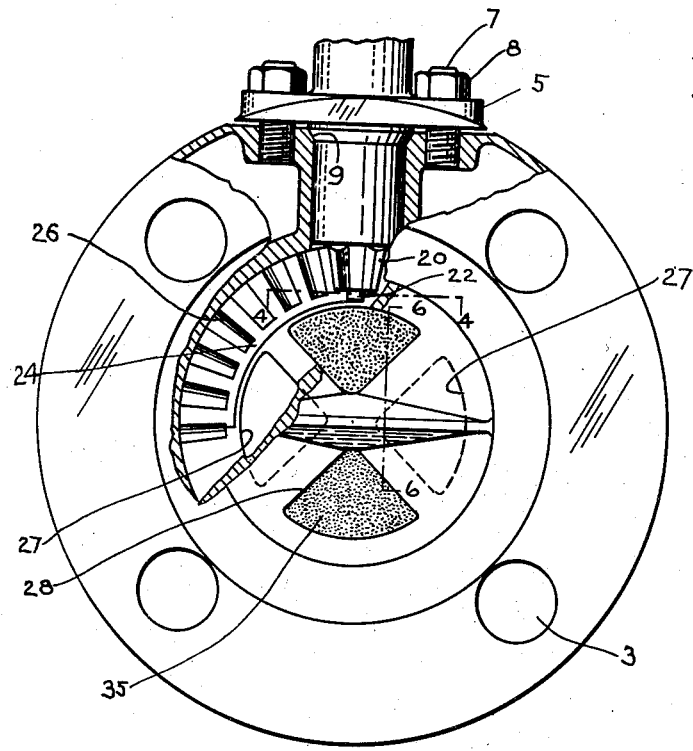
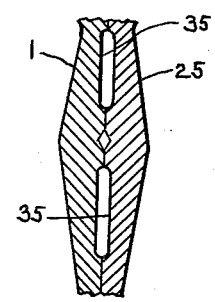
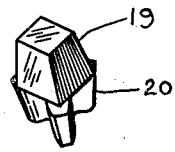
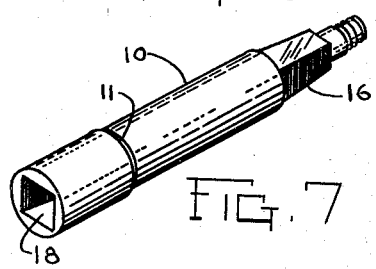
INVENTOR.
Michael Smolensky
BY John A. Bommhardt
ATTORNEY.

Patented June 3, 1930

1,761,595

UNITED STATES PATENT OFFICE

MICHAEL SMOLENSKY, OF CLEVELAND, OHIO

VALVE

Application filed May 11, 1928. Serial No. 277,059.

The purpose of this invention is to provide certain improvements in my Patent No. 1,592,471 dated July 13, 1926, for a packless valve.

As previously constructed there was a possibility of damage occurring to that portion of the valve seat which was exposed when the valve was in the closed position. Any burrs or corrosion on such portion would score the active portion of the coacting surface with the danger of causing leakage. The improved construction protects all active valve seat surfaces both in the open and closed positions of the valve.

A further improvement eliminates the use of a gasket between the bonnet and the body of the valve.

Another improvement reduces the strains transmitted from the three tooth pinion to the valve stem thereby reducing wear and consequent leakage and also effects a saving in manufacturing expense inasmuch as the pinion may be cast by itself instead of the necessity of machining it true with the stem.

In the drawings:

Fig. 3 is a view similar to Fig. 1 showing the relation of the parts when the valve is closed.

Fig. 4 is a partial section on line 4—4 of Fig. 3 showing detail of provision for lower bearing of pinion.

Fig. 5 is a broken section on line 5—5 of Fig. 1 showing the relative position of the valve seats when the valve is open.

Fig. 6 is a broken section on line 6—6 of Fig. 3 showing the relative position of the valve seats when the valve is closed.

Fig. 7 is a perspective view of the valve stem.

Fig. 8 is a broken section on line 8—8 of Fig. 1.

Fig. 9 is a perspective view of the three tooth pinion.

Figures 1, 2:
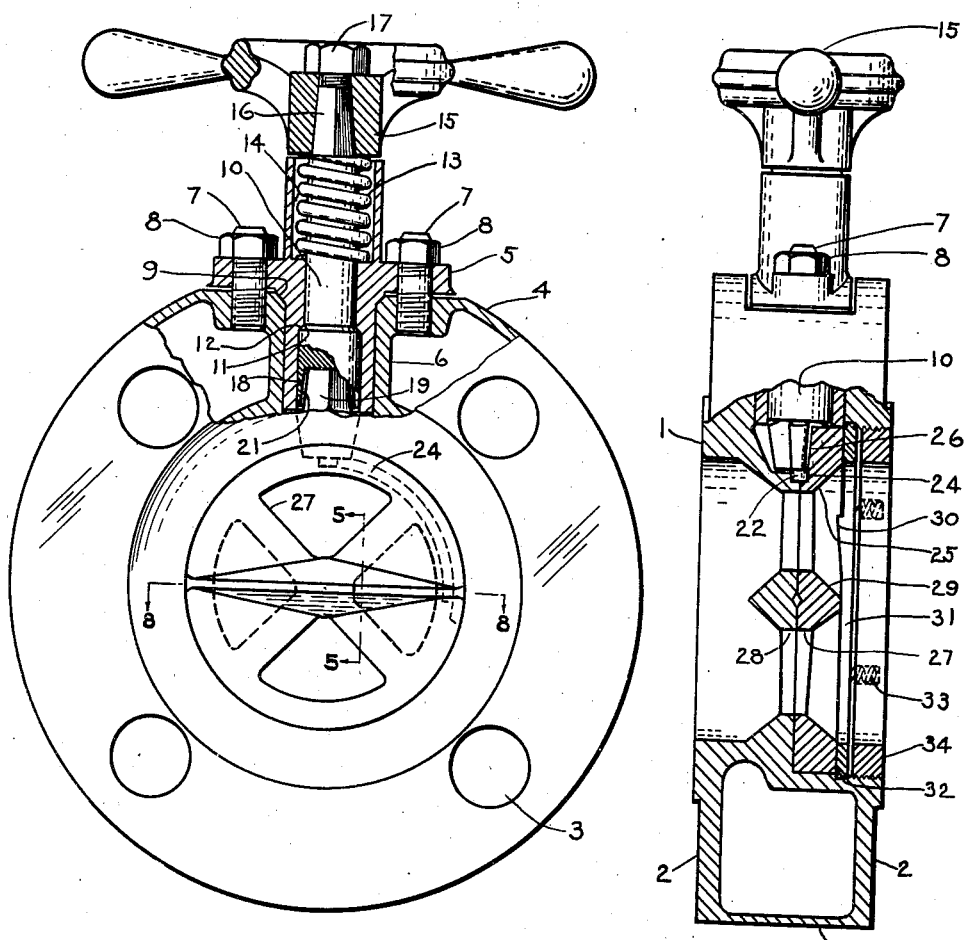
Fig. 1 is a face view of a packless valve constructed so as to embody the features of this invention, parts being broken away to show internal details.
Fig. 2 is a side view partly in section.

Although this invention could be applied to many types of valves it is shown in connection with a flanged construction in which the body 1 of the valve is provided with flanges 2 provided with bolt holes 3, said flanges 2 being conveniently connected by an exterior wall 4. A valve bonnet 5 is inserted through a tubular neck or portion 6 of the body 1 and by means such as studs 7 and nuts 8 is securely clamped against a conical seat 9 at the outer end of the neck whereby a tight joint is produced between the bonnet 5 and the body 1 eliminating the use of any gasket.

A valve stem 10 provided with a beveled shoulder 11 intermediate its length is mounted in the before mentioned bonnet 5 with said beveled shoulder 11 bearing against a corresponding beveled seat 12 in said bonnet and held in non-leakable contact therewith by a spring 13 surrounding said stem 10 and pocketed within a recess 14 in said bonnet 5. The said spring 13 is held in operative compression by a suitable handwheel 15 secured to the outwardly projecting end of the stem 10 by means such as a square tapered tang 16 and a nut 17.

The inwardly projecting end of said stem 10 is provided with a socket 18, which may conveniently be square as shown, adapted to engage the shank 19 of a three toothed pinion 20. It will be noted that a certain amount of lateral freedom is allowed between said socket 18 and said shank 19 as shown at 21, whereby variations of axial alignment between said stem 10 and said pinion 20 during operation of the valve are absorbed without putting undue strain on the joint between said stem 10 and said bonnet 5.

Furthermore it will be noted that the end of said shank 19 does contact with the bottom of said socket 18 whereby the end thrust of said beveled pinion 20 is transmitted axially to said stem 10 in a direction to assist in the seating of shoulder 11 against seat 12.

Integral with the beveled pinion 20 is a projection serving as a pivot 22 which is journaled in a divided bearing consisting of a half bearing 23 in the valve body 1 adapted to align said pinion 20 and take the side thrust thereof. The pivot 22 is held to position in the half bearing 23 by contacting with the side of a quadrant groove 24 formed in the rotatable valve disc 25 in proximity to a quadrant of bevel gear teeth 26 formed on said valve disc 25 and adapted to mesh with and be rotatably operated by the three tooth bevel pinion 20.

The said rotation of valve disc 25 causes ports or openings 27 to align with, or cover as the case may be, similar stationary openings 28 in the body 1 of the valve, or in other words open and close the valve.

The valve disc 25 is further provided with a strain equalizing rib 29 and a plurality of cams 30 adapted to cooperate with similar cams on an axially movable ring 31 which ring is held from rotation by lugs 32 and is held against the valve disc 25 by pocketed springs 33 located in a locking ring 34. By this arrangement chattering of the valve disc is eliminated, and self grinding of the valve seat secured.

It is to be noted that the arrangement of the active seating surfaces of the rotatable valve seat 25 and the coacting portion of the valve body 1 is such that both in the closed position (Fig. 3) and in the open position (Fig. 1) the said active seating surfaces are thoroughly protected from abrasion by completely covering one another and only the depressed rough cored surface 35 is exposed. By this means any abrasion or corrosion to the exposed surface will not affect the active seating surfaces upon operation of the valve.

I claim:

1. A valve comprising an annular body, a rotary disk in said body, the body having a half bearing adjacent said disk, and the disk having a corresponding segmental bearing groove, with teeth adjacent said groove, a radial pinion having a journal stud extending into said half bearing and groove, and means to turn the pinion.

2. A valve as set forth in claim 1, the journal stud being located at the inner end of the pinion, and the means to turn the pinion including a valve stem extending through the body and having a loose connection with the outer end of the pinion.

In testimony whereof, I do affix my signature.

MICHAEL SMOLENSKY.